US012668216B2

(12) United States Patent
Carvalho et al.

(10) Patent No.: US 12,668,216 B2
(45) Date of Patent: Jun. 30, 2026

(54) BRAKING CONTROL METHOD

(71) Applicant: AMPERE S.A.S., Boulogne Billancourt (FR)

(72) Inventors: Julien Carvalho, Guyancourt cedex (FR); Thibault Hallouin, Guyancourt cedex (FR)

(73) Assignee: AMPERE S.A.S., Boulogne Billancourt (FR)

( * ) Notice: Subject to any disclaimer, the term of this patent is extended or adjusted under 35 U.S.C. 154(b) by 94 days.

(21) Appl. No.: 18/701,006

(22) PCT Filed: Oct. 10, 2022

(86) PCT No.: PCT/EP2022/078094
§ 371 (c)(1),
(2) Date: May 10, 2024

(87) PCT Pub. No.: WO2023/061936
PCT Pub. Date: Apr. 20, 2023

(65) Prior Publication Data
US 2024/0409068 A1 Dec. 12, 2024

(30) Foreign Application Priority Data
Oct. 14, 2021 (FR) ..................................... 21 10881

(51) Int. Cl.
*B60T 7/22* (2006.01)
*B60W 10/18* (2012.01)
(Continued)

(52) U.S. Cl.
CPC ............... *B60T 7/22* (2013.01); *B60W 10/18* (2013.01); *B60W 30/09* (2013.01);
(Continued)

(58) Field of Classification Search
CPC .... B60T 7/22; B60T 2201/022; B60W 10/18; B60W 30/09; B60W 30/0956;
(Continued)

(56) References Cited

U.S. PATENT DOCUMENTS 6,223,117 B1 4/2001 Labuhn et al.
9,771,055 B1 * 9/2017 Zhang ................. B60T 8/17558
(Continued)

FOREIGN PATENT DOCUMENTS

DE 10 2015 216 679 A1 3/2017
FR 2 763 902 A1 12/1998
(Continued)

OTHER PUBLICATIONS

Machine translation of KR-20160064669-A (Year: 2016).*
(Continued)

*Primary Examiner* — Navid Z. Mehdizadeh
*Assistant Examiner* — Caitlin R Mccleary
(74) *Attorney, Agent, or Firm* — Oblon, McClelland, Maier & Neustadt, L.L.P.

(57) ABSTRACT

A method controls autonomous emergency braking of an ego motor vehicle by initializing a braking reserve level and a time counter to a predetermined value, activating autonomous emergency braking, consuming a braking reserve and decrementing the braking reserve level for as long as the autonomous emergency braking is active, deactivating the autonomous emergency braking as soon as a braking request is interrupted or the braking reserve level reaches zero, incrementing a time counter as soon as autonomous emergency braking is deactivated and as long as no new autonomous emergency braking is activated, resetting the time counter to the predetermined time value as soon as a predetermined time threshold is reached by the time counter or as soon as new autonomous emergency braking is acti- (Continued)

vated before said time threshold is reached, and resetting the braking reserve to the predetermined value as soon as the time counter exceeds the time threshold.

13 Claims, 2 Drawing Sheets

(51) Int. Cl.
  *B60W 30/09*  (2012.01)
  *B60W 30/095*  (2012.01)
  *B60W 30/16*  (2020.01)

(52) U.S. Cl.
  CPC ........ *B60W 30/0956* (2013.01); *B60W 30/16* (2013.01); *B60T 2201/022* (2013.01); *B60W 2554/802* (2020.02)

(58) Field of Classification Search
  CPC ........... B60W 30/16; B60W 2554/802; B60W 2520/10; B60W 2554/804; B60W 2754/30; B60W 2754/50; B60W 30/0953

See application file for complete search history.

(56) References Cited

U.S. PATENT DOCUMENTS

| | | | | |
|---|---|---|---|---|
| 2006/0097570 A1* | 5/2006 | Doerr | ....................... | B60Q 1/44 |
| | | | | 303/193 |
| 2007/0236077 A1* | 10/2007 | Schweikert | .......... | B60T 8/1893 |
| | | | | 303/7 |
| 2018/0186350 A1 | 7/2018 | Gotz et al. | | |

FOREIGN PATENT DOCUMENTS

| | | | | | | |
|---|---|---|---|---|---|---|
| JP | 2011042194 A | * | 3/2011 | | | |
| JP | 2013203153 A | * | 10/2013 | | | |
| KR | 20160064669 A | * | 6/2016 | ........... | B60W 10/18 |
| WO | WO-2017220176 A1 | * | 12/2017 | ........... | G08G 1/165 |

OTHER PUBLICATIONS

Machine translation of JP-2011042194-A (Year: 2011).*
Machine translation of WO-2017220176-A1 (Year: 2017).*
Machine translation of JP-2013203153-A (Year: 2013).*
International Search Report issued Jan. 19, 2023 in PCT/EP2022/078094, filed on Oct. 10, 2022, 2 pages.
French Preliminary Search Report issued May 6, 2022 in FR Application 21 10881, filed on Oct. 14, 2021, 3 pages (with English Translation of Categories of Cited Documents).

* cited by examiner

BRAKING CONTROL METHOD

BACKGROUND

The present invention regards a method and device for providing advanced driver assistance (i.e. to what is known to those skilled in the art by the acronym ADAS, which stands for Advanced Driver Assistance System) and relates to a method for controlling braking force and more particularly to a method for controlling the braking force generated in association with an autonomous emergency braking operation depending on a relative speed. The invention is advantageously applicable in the form of a motor-vehicle device for controlling braking force and of a motor vehicle equipped with such a device for controlling braking force and of a computer program product comprising program code instructions stored on a computer-readable medium for implementing the steps of the method according to the invention.

FIG. 1 illustrates the architecture of a prior-art autonomous-emergency-braking module 3 incorporated in an advanced driver assistance system 2 of an ego vehicle 1 interacting with a target 6. The vehicle 1 comprises perceiving means 4, in particular for perceiving characteristics specific to the ego vehicle such as its speed, such as wheel speed sensors for example, but also characteristics related to the environment of the ego vehicle, such as distance sensors, or sensors for detecting objects, such as, for example, a radar or camera, that are connected to an input I2 of the advanced driver assistance system 2. An output S2 of the advanced driver assistance system 2 is connected by a controller area network (abbreviated CAN) to the system 5 for controlling braking means, which in particular comprises the vehicle dynamics control module (abbreviated VDCM) and the means for braking the vehicle 1, which for example are disc brakes. The autonomous-emergency-braking command is thus conventionally transmitted to the VDCM, which applies the braking torque to the braking means of the vehicle 1. The advanced driver assistance system 2 comprises the braking module 3, an input I3 of which is connected to the input I2 of the system 2 and an output S3 of which is connected to the output S2 of the system 2. The perceiving means 4 transmit, to the module 3, information on distance and relative speed between the vehicle 1 and the target 6, which is for example a car, a pedestrian or a cyclist. When the braking module 3 perceives a definite risk of collision between the target 6 and the vehicle 1, the module 3 communicates with the control system 5, which controls and actuates the braking means in such a way as to cause autonomous braking of the vehicle 1 and prevent collision between the target 6 and the vehicle 1. The autonomous braking is controlled by the module 3 to the maximum of the capabilities of the braking means. In other words, the braking is controlled so that the stopping distance of the vehicle 1 is as short as possible, while guaranteeing the safety and in particular the stability of the ego vehicle. Braking thus controlled is emergency braking.

Thus, if an obstacle is detected in front of the ego vehicle, and if a collision with the obstacle is predicted, the ego vehicle performs autonomous emergency braking (abbreviated AEB), the control law of which is for example hosted in the module 3. In this way, the autonomous braking makes it possible to avoid the predicted collision with the obstacle located in front of the ego vehicle.

Various methods of autonomous emergency braking are known in the prior art. For example, document EP3119648 and document EP3625092, which address activation of autonomous emergency braking, are known.

Document FR1758199 addresses generation of the value of the braking setpoint in the event of an autonomous-emergency-braking request, taking into account the characteristics of the vehicle and the environmental conditions under which the ego vehicle is operating.

However, in the event of autonomous emergency braking of the ego vehicle, the following vehicle must perform a braking or avoidance maneuver or even change lane to avoid colliding with the ego vehicle. Therefore, depending on how autonomous braking of the ego vehicle is performed, the driver of the following vehicle may not be able to perform an appropriate driving operation after autonomous emergency braking of the ego vehicle, this increasing the risk of collision with the ego vehicle from behind.

In view of the above, it is known, for reasons of safety with respect to rear impact, to subject activation of the autonomous emergency braking to a limit in respect of the maximum longitudinal speed of the ego vehicle (for example an activation limit in respect of the maximum absolute speed of the ego vehicle is for example set to 80 km/h): this solution therefore considerably limits the availability of autonomous emergency braking when the ego vehicle is traveling at high speed. Alternatively, to solve this problem, the document DE102010029223 addresses interruption or reduction of autonomous emergency braking when collision speed between the ego vehicle and a following vehicle exceeds a certain threshold, but this solution suffers from the same pitfall as the previous one, and in the event of a reduction in braking force the associated drawback in particular resides in a safety risk. Alternatively, the document US2016221549 discloses an electronic control unit that will in particular modulate the braking force of the vehicle depending on distance and on the relative speed between the vehicle and a target, but this solution is complex and involves a risk in terms of safety and robustness in that it relies on external information delivered by sensors that may be a source of risk in respect of their reliability.

BRIEF SUMMARY

One of the aims of the invention is to remedy at least some of the drawbacks of the prior art by providing a method for controlling braking force that allows the availability of intense autonomous emergency braking to be improved when drying at high speed (freeway, interstate highways, etc.) while guaranteeing the safety of the ego vehicle and any following vehicle because its driver is not surprised by the autonomous emergency braking of the ego vehicle.

To this end, the invention provides a method for controlling autonomous emergency braking of an ego motor vehicle, comprising the following steps:

initializing a braking reserve level to a predetermined value, initializing a time counter to a predetermined time value, receiving a request for autonomous emergency braking, activating autonomous emergency braking, consuming the braking reserve and decrementing the braking reserve level for as long as said autonomous emergency braking is active, deactivating the autonomous emergency braking as soon as receipt of the request is interrupted or the braking reserve level reaches zero, incrementing a time counter as soon as autonomous emergency braking is deactivated and as long as no new autonomous emergency braking is activated, resetting said time counter to the predetermined time value as soon as a predetermined time threshold is reached by the time counter or as soon as new autonomous emergency braking is activated before said time threshold is reached, resetting the braking reserve to the predetermined value as soon as the time counter exceeds the time threshold.

This method allows the driver of the following vehicle to not be surprised and, by virtue of the invention, the ego vehicle to apply autonomous emergency braking more of the time (increased availability), while using reliable and robust data, thus improving safety, even in the case of a number of successive braking operations.

The advantage of the feature whereby the predetermined value of the braking reserve is expressed in the form of a speed is that it allows availability to be allocated in relative terms, and thus use of autonomous emergency braking not to be restricted at moderate ego-vehicle speeds and to also allow the reserve to be decremented on the basis of reliable and robust data. As a variant, the advantage of the feature whereby the predetermined value of the braking reserve is expressed in the form of a distance is that it allows context to be taken into account, by defining as reserve the distance for which the ego vehicle may brake depending on its deceleration. As a variant, the advantage of the feature whereby the predetermined value of the braking reserve is expressed in the form of a time is that it allows context to be taken into account, by defining as reserve the emergency braking time for which the ego vehicle may brake depending on its deceleration.

According to one advantageous characteristic, the method also comprises a step of determining a variable representative of the dynamics of the ego vehicle, the variable representative of the dynamics of the ego vehicle being a norm of the velocity vector of the ego vehicle $\|Vego\|$, this making it possible to use a robust variable transiting over the controller area network (CAN) of the vehicle. Likewise, advantageously, if the braking reserve is expressed in the form of a distance, the variable representative of the dynamics of the ego vehicle corresponds to the norm of the velocity vector of the ego vehicle $\|Vego\|$, this making it possible to compute, based on a model, the distance traveled by the ego vehicle during the activated emergency braking, and also making it possible to reason on a relative rather than absolute scale.

The advantage of the feature whereby the predetermined time value of the time counter is zero is that it allows the method to be simplified by using positive incrementation of the time counter.

According to one advantageous feature, the decrementation of the level of the braking reserve Reserve between a current time interval t and a previous time interval t−1 is computed by subtracting, from the level of the reserve Reserve, the difference between the norm of the ego velocity vector $\|Vego\|$ in the previous time interval t−1 and the norm of the ego velocity vector $\|Vego\|$ in the current time interval t, according to the equation:

$$Reserve(t)=Reserve(t-1)-(\|Vego(t-1)\|-\|Vego(t)\|)$$

provided that said difference ($\|Vego\ (t-1)\|-\|Vego(t)\|$) is positive.

This computation makes it possible not to take into account in the decrementation cases where speed increases for external reasons (slope for example).

The advantage of the feature whereby the predetermined value of the braking reserve is dependent on the driving situation is that it in particular makes it possible to adapt to the urban or extra-urban nature of the surroundings being driven through.

According to another advantageous feature, said time threshold is between two and five seconds, and is preferably four seconds, this making it possible to distinguish events giving rise to autonomous emergency braking, while preserving the lifespan of the braking means applied by the VDCM.

According to another advantageous feature, the method also comprises a step of detecting a following vehicle behind the ego vehicle, this making it possible to be able to characterize the risk of a rear-end collision.

According to another advantageous feature, said time threshold is dependent on detection of a following vehicle, i.e. dependent on the presence or absence of a detected following vehicle, this making it possible to decrease the time threshold in the absence of a following vehicle because there is no risk of surprising its driver, thereby permitting closely spaced successive braking operations.

Advantageously, the predetermined initialization value of the braking reserve level is dependent on detection of a following vehicle, i.e. dependent on the presence or absence of a detected following vehicle, this making it possible to increase the reserve in the absence of a following vehicle because there is no risk of surprising its driver, thereby permitting unconstrained braking since the constraint in respect of the difference in relative speed between the ego vehicle and the following vehicle is no longer relevant.

The invention also relates to a module for controlling autonomous emergency braking comprising means for implementing the method according to the invention, this having advantages analogous to those of the method.

The invention also relates to a motor vehicle comprising a module according to the invention, this having advantages analogous to those of the method, the device being located on board the vehicle.

The invention also relates to a computer program product downloadable from a communication network and/or stored on a data medium that is readable by a computer and/or executable by a computer, comprising instructions that, when the program is executed by the computer, cause the latter to implement the method according to the invention.

The invention also relates to a data storage medium comprising instructions that, when they are executed by a computer, cause the latter to implement the method according to the invention.

The invention also relates to a signal of a data carrier, carrying the computer program product according to the invention.

BRIEF DESCRIPTION OF THE DRAWINGS

Other aims, features and advantages of the invention will become apparent on reading the following description, which is given merely by way of non-limiting example, with reference to the appended figures, in which.

DETAILED DESCRIPTION

Throughout this text, directions and orientations are designated with reference to a direct orthonormal coordinate system XYZ conventionally used in automotive design, where X designates the longitudinal direction of the vehicle, which is directed forward, Y is the direction transverse to the vehicle, directed to the left, and Z is the vertical direction directed upwards. The concepts "front" and "rear" are to be understood with respect to the normal forward direction of travel of the vehicle. For the sake of clarity, identical or similar elements have been identified by identical reference signs in all the figures.

In one embodiment, the ego vehicle 1, whether it is autonomous or not, has a steered front axle with front wheels and a rear axle having rear wheels 10 with which it may be driven. The vehicle 1 has an internal-combustion engine and/or electric motor, which drives the rear wheels via a gear set, a drive shaft, a differential and drive shafts for driving the rear axle. The wheels of the vehicle are connected to respective braking means, which may be actuated by a fluid under pressure. The front wheels are steered by means of a steering wheel and a steering device placed on the front axle.

Figure 1:
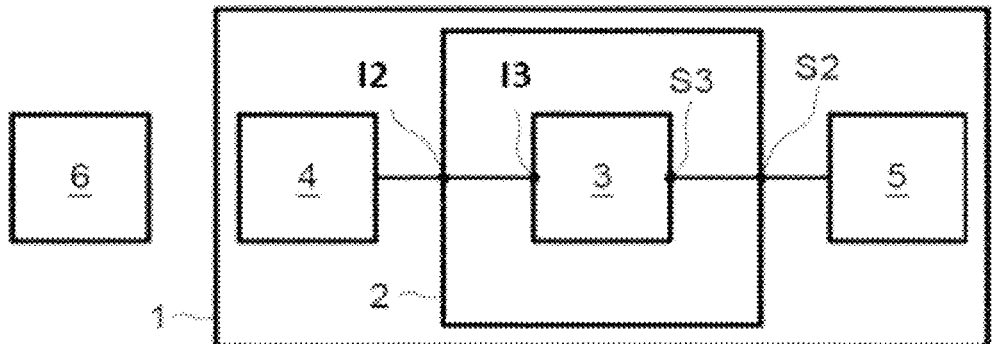
FIG. 1, which has already been mentioned, shows the general architecture of an emergency braking device incorporated into a vehicle according to the prior art.
Figures 2, 3:
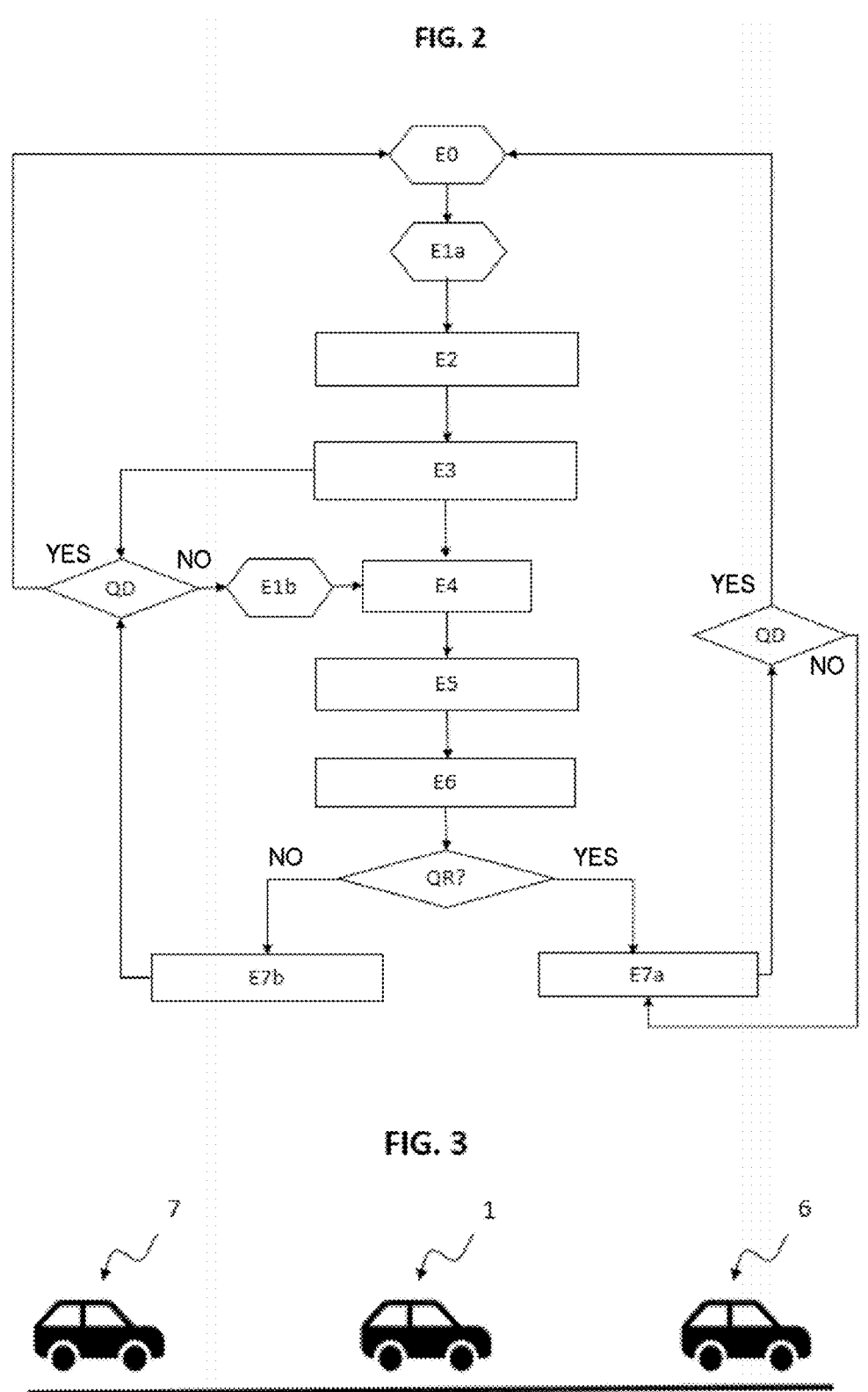
FIG. 2 shows a flowchart of operation of the method according to the invention.
FIG. 3 shows a schematic view of a driving situation encountered by the vehicle.

In [FIG. 2], the flowchart of operation of the method according to one preferred embodiment of the invention has been shown. The method for controlling autonomous emergency braking of an ego motor vehicle 1 comprises the following steps:

E0: initializing a braking reserve level to a predetermined value,

E1a: initializing a time counter to a predetermined time value,

E2: determining a variable representative of the dynamics of the ego vehicle 1,

E3: receiving a request for autonomous emergency braking,

E4: activating (first) autonomous emergency braking,

E5: consuming the braking reserve and decrementing, depending on the speed Vego of the ego vehicle, the braking reserve level for as long as said autonomous emergency braking is active, E6: deactivating the autonomous emergency braking as soon as receipt of the request is interrupted or the braking reserve level reaches zero, E7a and E7b: incrementing a time counter as soon as autonomous emergency braking is deactivated and as long as no new autonomous emergency braking is activated, E1b: resetting said time counter to the predetermined time value as soon as a predetermined time threshold is reached by the time counter or as soon as new autonomous emergency braking is activated before said time threshold is reached, E0: resetting the braking reserve to the predetermined value as soon as the time counter exceeds the time threshold.

The method shown here is embedded in a module for controlling autonomous emergency braking of the autonomous-emergency-braking module 3, which is preferably integrated into the ADAS controller of the advanced driver assistance system 2; however, it may also be integrated into the controller of one of the perceiving means 4, such as the controller of the camera for example.

In one non-limiting embodiment, when the ego vehicle 1 is started, the braking reserve level is initialized, in step E0, to a predetermined relative speed value. The expression "relative-speed reserve" is understood to mean the decrease in speed available at the time t to the ego vehicle, in contrast to a limitation on autonomous emergency braking contingent on a maximum speed of the ego vehicle. The term "speed" here applies to the norm $\|Vego\|$ of the velocity vector of the ego vehicle. The predetermined relative-speed value is between 50 and 90 km/h, and preferably 80 km/h, this value possibly also depending on the driving situation, for example whether the vehicle is being driven through urban surroundings, the use case of which is determined by means of optical recognition of road signs (for urban driving the predetermined relative-speed value is 50 km/h, whereas for extra-urban driving the predetermined relative-speed value is 80 km/h).

As a variant, the reserve may also be initialized to a predetermined ego-vehicle braking time, this time reserve corresponding, at the time t, to the braking time permitted for the ego vehicle. This time may be based on the time to collision (TTC), which is computed elsewhere and received by the module for controlling autonomous emergency braking, but preferably this emergency-braking time is computed as being the braking time required, approximating the deceleration under autonomous emergency braking to 1 g, to decrease the speed of the ego vehicle 1 here by the entire reserve, i.e. 80 km/h here, for example by means of a model of the behavior of the target assuming constant acceleration or speed.

As a variant, the reserve may also be initialized to a distance, this reserve corresponding, at the time t, to the emergency-braking distance permitted for the ego vehicle. This distance may be based on the distance to collision (DTC), which is computed elsewhere and received by the module for controlling autonomous emergency braking, but preferably, as above, this emergency-braking distance is computed as being the braking distance traveled, approximating the deceleration under autonomous emergency braking to 1 g, to decrease the speed of the ego vehicle 1 here from 80 km/h, for example by means of a model of the behavior of the target assuming constant acceleration or speed.

All these variants make it possible to reason in relative terms and not in absolute terms, unlike the case where autonomous emergency braking is contingent on a maximum speed of the ego vehicle, since it is a question of a reserve, irrespectively of whether it is expressed as a speed or a duration or a distance of autonomous emergency braking.

Thus, if the relative-speed reserve is 80 km/h, and the ego vehicle 1 driving at 130 km/h brakes on a target vehicle driving at 60 km/h, then the ego vehicle will benefit from autonomous emergency braking until it reaches the end of the braking request, when it will still have 10 km/h left in its reserve.

The step E1a of initializing the time counter to a predetermined time value, here zero, preferably takes place simultaneously with the step E0 of initializing the reserve level and makes it possible to count incrementally, in the subsequent step E7a and E7b, for reasons of simplicity and so as to allow easy management of time thresholds; however, this counter could also be initialized to the time-threshold value determined beforehand in step E1a and E1b and be decremented (i.e. incremented negatively) in step E7a and E7b.

The step E2 of determining a variable representative of the dynamics of the ego vehicle 1 takes place in each time interval, at a rate of once every 10 milliseconds for example. The variable representative of the dynamics of the vehicle preferably corresponds to the norm of the velocity vector of the ego vehicle 1 since the braking reserve is, in this example, expressed as a speed. Likewise, if the braking reserve is expressed as a distance, the speed of the ego vehicle 1 is a variable representative of dynamics to be taken into consideration to compute the distance traveled by the ego vehicle safely by means of a model such as described above for example, and if the reserve is expressed as a duration, there is no need to acquire a specific variable representative of the dynamics since the reserve is decremented temporally directly.

Thus, as soon as a target 6 is detected (step not shown), the target 6 is characterized dynamically and, depending on its characteristics, a first request for autonomous emergency braking, which will lead to safe braking, is sent by a module of the advanced driver assistance system 2 to the autonomous-emergency-braking module 3, which will receive this first autonomous-emergency-braking request relating to the detected target in step E3. On receipt of this request, first autonomous emergency braking is activated in step E4, i.e. the autonomous-emergency-braking module 3 permits it, the reserve being full, and transmits the autonomous-emergency-braking command to the system 5 for controlling the braking means and more particularly to the VDCM, which will control, either by way of a setpoint expressed as a deceleration (g) or by way of a setpoint expressed as a torque (Nm), the braking means so as to execute the autonomous-emergency-braking command, until a force of 1 g is reached.

As long as the request persists and the first autonomous emergency braking is activated, the braking reserve is consumed in step E5, this resulting in a decrementation of the braking reserve level dependent on the speed of the ego vehicle, bearing in mind that the autonomous emergency braking will be deactivated in step E6 as soon as receipt of the request is interrupted or the braking reserve is exhausted, i.e. its level is zero. Thus, the braking reserve decreases depending on the relative speed, which is received by the control law every 10 ms, in each time interval of 10 ms; the decrementation of the level of the braking reserve between a current time interval and a previous time interval is therefore computed by subtracting, from the current reserve Reserve (t), the difference between the norm of the ego velocity vector Vego in the previous time interval t−1 and the norm of the ego velocity vector Vego in the current time interval t if it is positive, i.e. according to the equation:

$$\text{Reserve}(t)=\text{Reserve}(t-1)-(\|\text{Vego}(t-1)\|-\|\text{Vego}(t)\|),$$

if $\|\text{Vego}(t-1)\|-\|\text{Vego}(t)\|$ is positive.

This continues either until the reserve is completely exhausted, releasing the action of the brakes and inhibiting actuation of autonomous braking for a period of time determined in advance and corresponding to the predetermined time threshold, or until the request is interrupted, in particular for reasons such as successful braking or loss of the target, the value of the reserve then remaining at the value it had at the previous time. The speed, i.e. the norm $\|\text{Vego}\|$ of the velocity vector of the vehicle, which is used here, is very easy to obtain given that it is routed over the CAN, and is a very robust variable since it benefits from ASIL B (ASIL being the acronym of Automotive Safety Integrity Level). In contrast to a time or distance reserve, the speed reserve is preferred because it makes it possible not to make any assumptions regarding the ego vehicle 1 (at least model of the behavior of the ego vehicle assuming constant acceleration or speed) even though the assumption may be dynamic and updated in each time interval depending on the speed or acceleration of the ego vehicle 1.

Just as in the case of management of the time threshold, the reserve is preferably managed through decrementation, for reasons of simplicity since this in particular makes it possible to work solely with positive values, but it could for example also be managed by initializing the level to a negative value in step E0 and then incrementation in step E5 to a level of zero.

The rest of the method varies depending on the level remaining in the reserve, so as to be able to carry out successive braking operations provided that the speed reserve remains above zero, this making activation of autonomous emergency braking more robust, in particular in the event of sensor-related effects leading to loss and reappearance of targets. Whether the reserve is empty is tested in the step QR?, and if the level of the reserve is zero, YES, then step E7a is passed to, i.e. in this situation, as soon as autonomous emergency braking is deactivated, the time counter is incremented in each time interval until the time threshold, preferably four seconds, is reached, this being represented in the chart by a test QD of whether the time threshold has been reached. Thus, as soon as the time threshold of four seconds is reached, YES, the method loops back to step E0 of resetting the braking reserve to the predetermined value; otherwise, NO, the method loops back to the step E7a of incrementing the counter. During the incrementing step E7a, no autonomous emergency braking can be activated because the reserve is zero. Specifically, even if a request were made by a module of the ADAS, it would not be permitted by the autonomous-emergency-braking module 3 and autonomous emergency braking would therefore not be activated.

After deactivation of the first autonomous emergency braking, if, at the end of the test of whether the reserve is empty performed in step QR?, the reserve level is not zero, NO, this meaning that there is still an autonomous-emergency-braking reserve available, in step 7b the counter is incremented in each time interval as long as no autonomous emergency braking is activated. Specifically, if a new autonomous-braking request is received E3, it is tested QD whether the time threshold has been reached, and if the time threshold has been reached, YES, this meaning that there is still some reserve available but that the required new emergency braking does not belong to the same scene as the first event that gave rise to the first autonomous emergency braking, the method loops back to the step E0 of initializing the reserve and the step E1a of setting the time counter to the predetermined time value, i.e. zero here; however, if the time threshold has not been reached, NO, this meaning that there is still some reserve available and that the required new emergency braking still belongs to the same scene as the first event that gave rise to the first autonomous emergency braking, this potentially occurring in particular in the event of momentary loss of the target 6 by the sensors, then the time counter is reset to zero in step E1b, and new autonomous emergency braking is activated in step E4, i.e. the autonomous-emergency-braking module 3 permits it, the reserve being partially full, and transmits the autonomous-emergency-braking command to the system 5 for controlling the braking means and more particularly to the VDCM, which will set the deceleration setpoint of the braking means so as to execute the autonomous-emergency-braking command, until a maximum force of 1 g is reached. The step E1b of resetting the time counter to zero makes it possible to ensure that four seconds are indeed waited to refill the reserve once braking is no longer being applied, the value of four seconds corresponding to the preferred value of the time threshold.

The time threshold is equal to between two and five seconds, this making it possible to distinguish between events giving rise to autonomous emergency braking of different scenes, while preserving the lifespan of the braking means applied by the VDCM.

With reference to [FIG. 2], the method advantageously comprises a step of detecting a vehicle 7 following the ego vehicle, which step is carried out by one of its rearward-oriented perceiving means 4, such as a radar or a camera, this step being carried out in each time interval, this making it possible to characterize the risk of a rear-end collision.

Thus, the value of the time threshold is preferably pre-determined depending on the presence or absence of a following vehicle 7 detected along the path corresponding to a predetermined sighting distance, said distance preferably being dependent on the speed difference between the following vehicle 7 and the ego vehicle 1, the value of the time threshold for example being decreased, or even lowered to zero, in the absence of a following vehicle 7 because there is no risk of surprising its driver by permitting closely spaced successive braking operations.

Likewise, the predetermined initialization value of the braking reserve level is preferably dependent on the presence or absence of a detected following vehicle 7, the reserve for example being increased, for example to more than 100 km/h, and preferably to 130 km/h, in the absence of a following vehicle 7 because there is no risk of surprising its driver by permitting any braking since the constraint in respect of the relative-speed difference between the ego vehicle and the following vehicle is no longer relevant.

The invention claimed is:

1. A method for controlling autonomous emergency braking of an ego motor vehicle, comprising:

initializing a braking reserve level to a predetermined value;

initializing a time counter to a predetermined time value;

receiving a request for autonomous emergency braking;

activating autonomous emergency braking;

consuming a braking reserve and decrementing the braking reserve level for as long as said autonomous emergency braking is active;

deactivating the autonomous emergency braking in response to the braking reserve level reaching zero;

incrementing the time counter as soon as autonomous emergency braking is deactivated and as long as no new autonomous emergency braking is activated;

resetting said time counter to the predetermined time value as soon as a predetermined time threshold is reached by the time counter or as soon as new autonomous emergency braking is activated before said time threshold is reached; and resetting the braking reserve to the predetermined value as soon as the time counter exceeds the time threshold, the autonomous emergency braking remaining deactivated from the deactivating until the resetting the braking reserve, wherein the braking reserve level is set prior to the receiving the request for autonomous emergency braking.

2. The method for controlling autonomous emergency braking of an ego motor vehicle as claimed in claim 1, wherein the predetermined time value of the time counter is zero.

3. The method for controlling autonomous emergency braking of an ego motor vehicle as claimed in claim 1, wherein the predetermined value of the braking reserve is expressed in the form of a speed, of a distance, or of a time.

4. The method for controlling autonomous emergency braking of an ego motor vehicle as claimed in claim 1, wherein the predetermined value of the braking reserve is dependent on a driving situation.

5. The method for controlling autonomous emergency braking of an ego motor vehicle as claimed in claim 1, wherein the predetermined value of the braking reserve is dependent on whether a driving situation is urban or extra-urban.

6. The method for controlling autonomous emergency braking of an ego motor vehicle as claimed in claim 1, further comprising determining a variable representative of dynamics of the ego vehicle, the variable representative of the dynamics of the ego vehicle being a norm of a velocity vector of the ego vehicle.

7. The method for controlling autonomous emergency braking of an ego motor vehicle as claimed in claim 6, wherein the decrementation of the level of the braking reserve between a current time interval (t) and a previous time interval (t−1) is computed by subtracting, from the level of the reserve (Reserve), the difference between the norm ($\|Vego\|$) of the ego velocity vector in the previous time interval (t−1) and the norm ($\|Vego\|$) of the ego velocity vector in the current time interval (t), according to the equation $$\text{Reserve}(t)=\text{Reserve}(t-1)-(\|Vego(t-1)\|-\|Vego(t)\|)$$

provided that said difference ($\|Vego(t-1)\|-\|Vego(t)\|$) is positive.

8. The method for controlling autonomous emergency braking of an ego motor vehicle as claimed in claim 1, wherein said time threshold is between two and five seconds.

9. The method for controlling autonomous emergency braking of an ego motor vehicle as claimed in claim 1, wherein said time threshold is four seconds.

10. The method for controlling autonomous emergency braking of an ego motor vehicle as claimed in claim 1, further comprising detecting a following vehicle behind the ego vehicle.

11. The method for controlling autonomous emergency braking of an ego motor vehicle as claimed in claim 1, wherein said time threshold is dependent on detection of a following vehicle.

12. The method for controlling autonomous emergency braking of an ego motor vehicle as claimed in claim 1, wherein the predetermined value of the braking reserve level is dependent on detection of a following vehicle.

13. A non-transitory computer readable medium storing a program that, when executed by a computer, causes the computer to execute the method for controlling autonomous emergency braking of the ego motor vehicle as claimed in claim 1.

* * * * *